No. 770,414. Patented September 20, 1904.

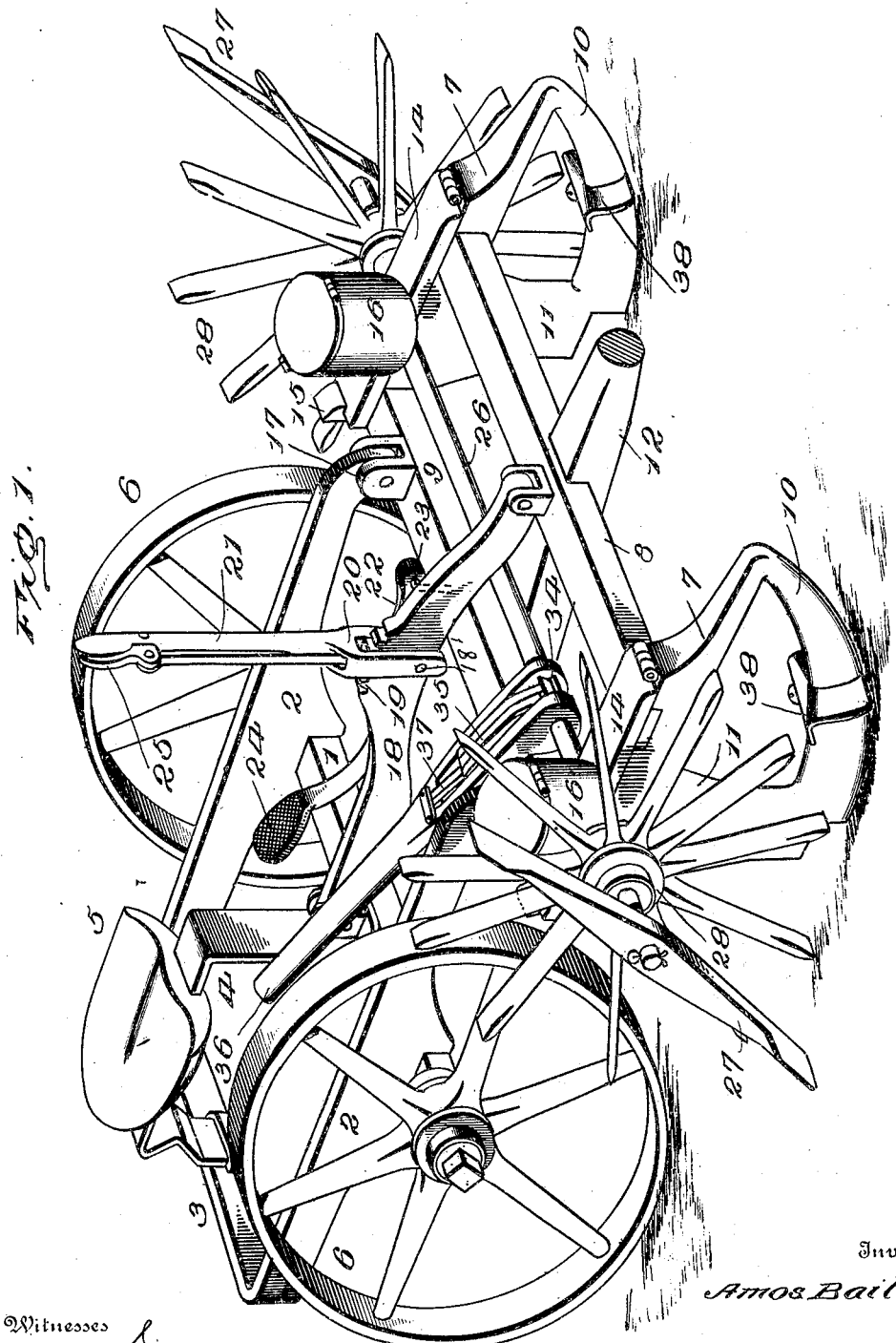

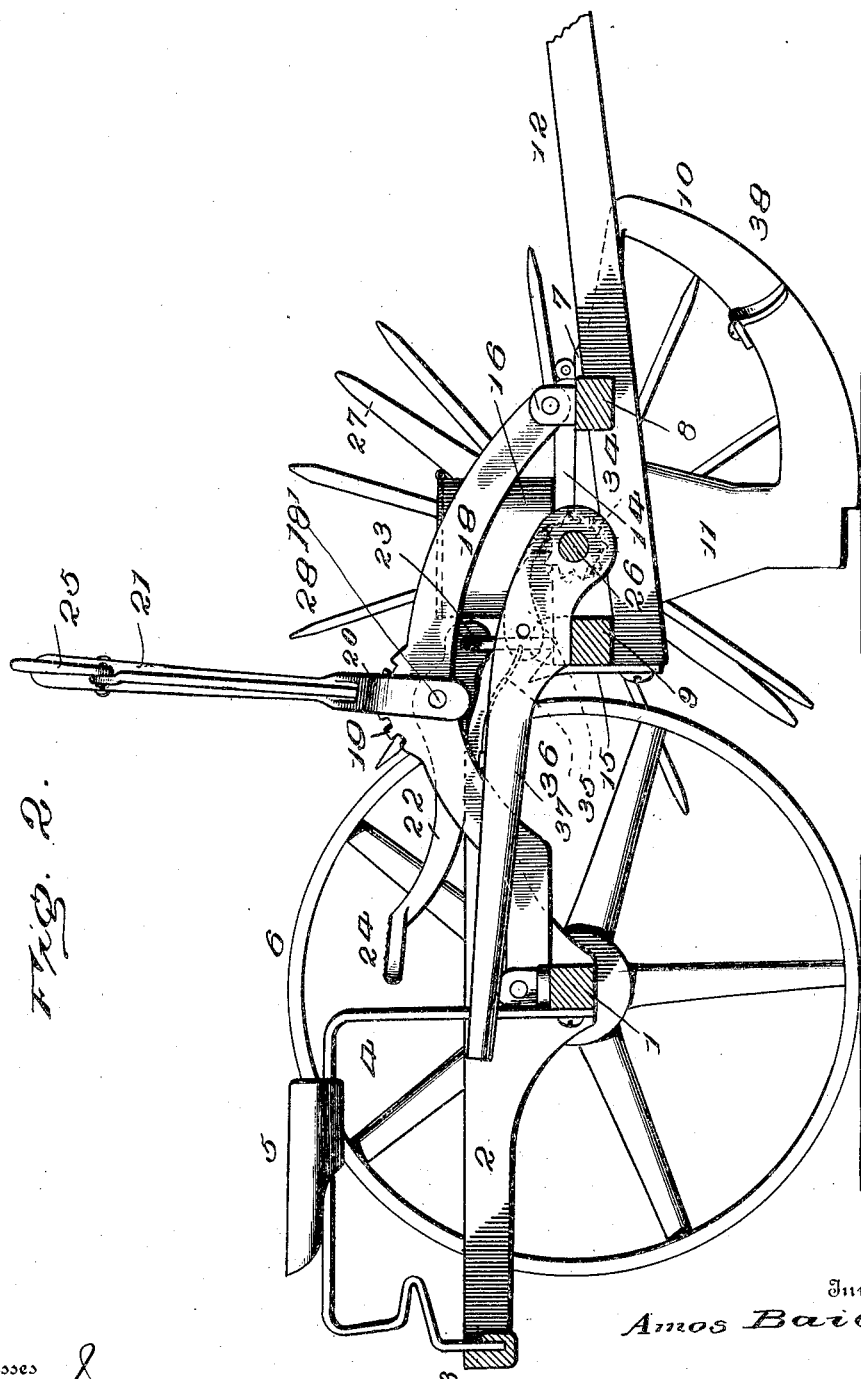

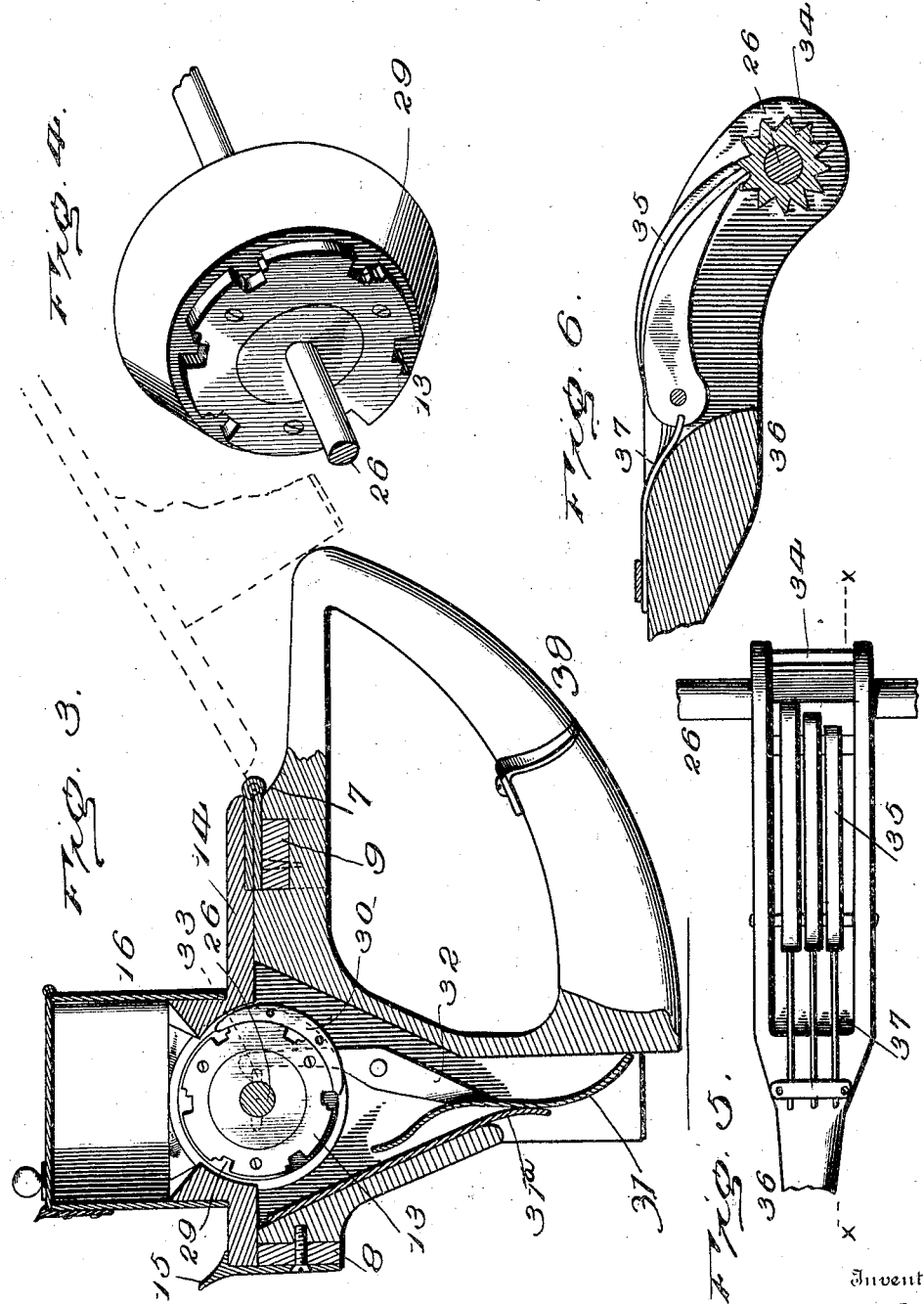

UNITED STATES PATENT OFFICE.

AMOS BAILEY, OF UNIONVILLE, IOWA.

CHECK-ROW CORN-PLANTER.

SPECIFICATION forming part of Letters Patent No. 770,414, dated September 20, 1904.

Application filed December 31, 1903. Serial No. 187,365. (No model.)

*To all whom it may concern:*

Be it known that I, AMOS BAILEY, a citizen of the United States, residing at Unionville, in the county of Appanoose and State of Iowa, have invented certain new and useful Improvements in Check-Row Corn-Planters, of which the following is a specification.

The purpose of this invention is to provide a machine of simple and compact construction for sowing seed in check-rows and which obviates the use of the accustomed check-line and drive-gearing between the axle and the shaft, having the seed-dropping device connected directly thereto.

In its organization the planter embodies wheel and runner frames loosely connected to admit of independent movement, operating means under control of the driver to admit of throwing the planting mechanism out of action at will, as when reaching the end of a row to make a turn preliminary to recrossing the field, an operating-shaft provided at opposite ends with markers and drivers, the latter consisting of wheels having arms radiating from the hubs and sharpened at their ends, so as to readily penetrate the soil, the arms of one driver or wheel being set staggering with reference to the arms of the other wheel or driver, and cutting mechanism for alining the machine so as to drop the seed in parallel rows transversely of the field, all as will appear more fully hereinafter and illustrated in the drawings hereto attached, in which—

Figure 1 is a perspective view of a check-row planter embodying the invention. Fig. 2 is a central longitudinal section thereof. Fig. 3 is a vertical longitudinal section of a runner and hopper, the dotted lines showing the position of the hopper when thrown upward and forward out of the way to admit of removing the operating-shaft, so as to change the seed-dropping wheel or plate, or for other purpose. Fig. 4 is a detail view of the seed-dropping wheel or plate on a larger scale. Fig. 5 is a detail view of the adjusting-lever and a portion of the operating-shaft, showing the ratchet-wheel with which the series of pawls coöperate. Fig. 6 is a longitudinal section on the line X X of Fig. 5.

Corresponding and like parts are referred to in the following description and indicated in all the views of the drawings by the same reference characters.

The runner and wheel frames may be of any approved construction common in machines of this class. As shown, the wheel-frame comprises the axle 1, longitudinal bars 2, rigidly connected intermediate of their ends to the axle and having their front ends downwardly curved, and a cross-bar 3, connected at its ends in any substantial manner to the rear ends of the longitudinal bars 2. A seat-frame 4 of substantially U form is connected to the axle 1 and cross-bar 3 and supports the seat 5, which is adjustable on the horizontal portions toward and from the axle 1, thereby admitting of utilizing the weight of the driver for forcing the runners into the ground with a greater or less pressure. The supporting-wheels 6 are loosely mounted upon the spindles or arms of the axle 1 in any desired and usual manner.

The runner-frame comprises longitudinal bars 7, transverse bars 8 and 9, runners or furrow-openers 10, and vertical spouts 11, the latter connecting the rear ends of the bars 7 and runners 10. The pole or tongue 12 is firmly connected to the transverse bars 8 and 9 and is adapted to have the team hitched thereto in the usual way for drawing the machine over the field. The vertical spouts 11 flare longitudinally at their upper ends to accommodate the seed-dropping wheels or plates 13 and are cut away at their lower ends upon the rear side to admit of the earth closing over the grain after the latter has been dropped into the furrow or trench. Bars or frames 14 are hinged or pivotally connected at their front ends to the longitudinal bars 7 and are held closed upon the bars 7 by catches 15, connected to the transverse bar 8 and engaging over or with the rear ends of the bars or frames 14. The hoppers 16 are carried by the bars or frames 14 and are movable therewith. These hoppers are closed at their upper ends, so as to retain the grain when the bars or frames 14 are thrown upward and forward, as indicated by the dotted lines in Fig. 3. The front ends of the longitudinal bars 2 are pivotally connected to the transverse bar 9 in any determinate way, and, as illustrated, bracket-lugs 17 are secured to the bar 9 and receive between their ears or spaced parts the curved ends of the bars 2, the overlapping parts being transversely apertured to receive the pivot-pins. A bar 18 is pivotally connected at its rear end to the axle 1 and at its front end to the transverse bar 8, and its front portion is upwardly curved and provided intermediate of its ends with a toothed segment 19, which coöperates with the latch-bar 20 of the lever 21, so as to hold the runner-frame in the required adjusted position. The lever 21 is fulcrumed to the bar 18 by pin 18', concentric with the toothed segment 19, and has a forward extension 22, which is connected by link 23 with the rear transverse bar 9 of the runner-frame. A foot-lever 24 projects rearward from the lever 21 to admit of operating the same when desired by pressure. The latch-bar 20 is adapted to be operated by the usual hand-latch 25, pivoted to the lever 21. Upon operating the lever 21 either by hand or foot power, or both, the runner-frame may be adjusted to run deep, or shallow or lifted from the ground to admit of moving the machine over the field without operating the planting mechanism, the latch-bar 20 coöperating with the toothed segment 19 to hold the runner-frame in the adjusted position.

The operating-shaft 26 is journaled near its ends in bearings provided upon the runner-frame, said bearings being closed by the bars or frames 14, which when closed upon the bar 7 hold the operating-shaft against accidental displacement. The operating-shaft is provided with the seed-dropping wheels or plates, the drivers and the markers all being connected directly thereto in any manner found most advantageous. The markers 27 consist of bars having their outer ends flattened and tapered to edges, so as to readily penetrate the soil and indent the same, so as to indicate the hills. The drivers 28 are preferably rimless wheels, each consisting of a hub and arms or spokes radiating from the hub and sharpened at their outer ends, so as to readily enter the soil and offer a minimum amount of resistance to the advancement of the machine over the field, the outer ends of the arms being transversely widened to prevent slipping and insure positive rotation of the shaft. The drivers are set so that the arms of one alternate with the arms of the other, thereby insuring contact of one or more of the arms with the ground at all times, which is essential to correct and positive operation of the same.

Each seed-dropping wheel or plate 13 has its edge portion beveled and provided adjacent to the edge with notches 29, which are contracted at their inner ends and widened at their outer ends, one wall of the notches being straight and the opposite wall formed with an offset. There may be as many notches 29 as desired, depending upon the distance apart of planting the grain. These notches 29 may be formed in the body of the wheel or plate or in a ring secured to said plate, thereby admitting of substitution of rings, according to the nature of the grain to be planted and the distance apart of the hills. The upper portion of the seed-dropping wheel or plate extends into the hopper, and the lower portion projects into the spout, and in order to prevent crowding of the notches 29 a cut-off 30 is supplied and is arranged to close the outer edges of the notches and to permit the uncovering of the seed when the grain comes into position for dropping into the spout. This cut-off is preferably secured to the spout, although it may be secured to the longitudinal bar 7 or to the bar 14.

The lower end of each of the spouts 11 is closed by a plate 31, which in the present instance consists of a flat spring secured to the lower end of trip-lever 32 and having its lower portion normally extended into the space of the spout and bearing against its front wall. The plate 31 retains the grain in the spout until tripped at the proper instant to insure its quick descent into the trench or furrow. For operating the plate 31 the trip-lever 32 is pivoted intermediate of its ends to the spout, and its upper end is provided with a cam-head which bears against the shaft 26 and extends into the path of trips or stops 33, projected laterally from either the seed-dropping wheel or shaft. As the shaft 26 rotates by direct contact of the drivers 28 with the ground the trips or stops 33 come in contact with the trip-levers 32 and operate the same to move the lower ends of the plates 31 away from the front walls of the spout 11, thereby permitting the grain dropped by the wheel or plate 13 to escape and pass quickly into the trench or furrow. A spring 31ª, secured at its upper end to the rear wall of the spout, bears at its lower end against the plate 31 to press the same against the front wall of the spout.

In check-row planters of the types aforesaid it is not uncommon for the seed-dropping mechanism to get out of time, whereby the seed is planted out of transverse alinement. To remedy this difficulty, means have been devised for properly adjusting the seed-dropping mechanism so as to insure planting of the grain in parallel lines crosswise of the field. In the present instance this result is accomplished by providing the shaft 26 with a ratchet-wheel 34 for coöperation with a series of pawls 35, applied to the set-lever 36, loosely mounted upon the shaft 26 and extended within convenient reach of the driver's seat 5. The pivotal end of the set-lever 36 is forked or bifurcated, and the pawls 35 are arranged side by side in the space formed between the bifurcations or fork members and are pivoted upon the pin supported therein. Each pawl is actuated by means of a spring 37, so as to hold it in engagement with the teeth of the ratchet-wheel 34. The pawls are arranged so as to have their engaging edges disposed in echelon form, whereby one pawl only of the series is adapted to engage with a tooth of the ratchet-wheel, and this progressive or echelon arrangement of the pawls provides for a nicety of engagement of the pawls with the ratchet-teeth, whereby backward movement of the shaft 26 is prevented. The pawls 35 act in a dual capacity, first, to prevent backward rotation of the shaft 26, and, second, for coöperation with the set-lever to admit of turning said shaft forward for adjustment of the seed-dropping mechanism in the event of the seed being dropped out of line.

For pulverizing clods or pushing the same to one side a double or twin blade 38 is set astraddle of the runners 10 and is secured thereto in any substantial way. The members or wings of the blade 38 have their lower edges curved transversely and concave upon their front faces, after the fashion of moldboards, so as to shed the soil and move it laterally from the runner as the machine is drawn over the field.

Having thus described the invention, what is claimed as new is—

1. In a planter, the combination of runner and wheel frames flexibly connected, a bar spanning the flexible joint between the two frames and pivoted at its respective ends thereto, a lever fulcrumed to and carried by said bar and having connection with the rear portion of the runner-frame, and means for securing said lever to the bar in an adjusted position, substantially as set forth.

2. In a planter, the combination of runner and wheel frames flexibly connected, a bar spanning the joint between said frames and having its forward portion upwardly curved and pivotally connected at its respective ends to said frames and provided intermediate of its ends with a toothed segment, a lever fulcrumed to said bar concentric with the toothed segment thereof and having connection with the runner-frame in the rear of the pivotal connection of said bar therewith, and a latch carried by the lever and adapted to coöperate with the teeth of said toothed segment for holding the parts in an adjusted position, substantially as set forth.

3. In a planter, and in combination with the seed-dropping mechanism including an operating-shaft, means coöperating with said shaft for preventing backward rotation thereof and enabling the same to be moved forward for properly timing and alining the planting mechanism, said means consisting of a ratchet-wheel applied to the shaft, a set-lever loosely mounted upon said shaft, and a series of pawls carried by the set-lever and having their engaging ends progressively arranged to admit of their engagement with the teeth of the ratchet-wheel in successive order, substantially as and for the purpose specified.

4. In a planter, the combination of the spout, the hopper, a seed-dropping plate having its edge portion beveled and provided with notches adjacent to the beveled edge, said notches having one wall straight and the opposite wall offset, and a cut-off for closing the open side of a portion of the notches, substantially as specified.

In testimony whereof I affix my signature in presence of two witnesses.

AMOS BAILEY. [L. S.]

Witnesses:
W. H. UNDERWOOD,
LEWIS SWAIN.